(12) United States Patent
Frias et al.

(10) Patent No.: US 9,184,431 B2
(45) Date of Patent: Nov. 10, 2015

(54) MODULAR BATTERY SYSTEM AND COMPONENTS

(71) Applicant: Boston-Power, Inc., Westborough, MA (US)

(72) Inventors: Rui Frias, East Freetown, MA (US); Kenneth W. Sghia-Hughes, Acton, MA (US); Jamison Pezdek, Boston, MA (US); W. Dale Robertson, Charlton, MA (US); Eric J. Carlson, Sudbury, MA (US); Phillip E. Partin, Grafton, MA (US)

(73) Assignee: Boston-Power, Inc., Westborough, MA (US)

( * ) Notice: Subject to any disclaimer, the term of this patent is extended or adjusted under 35 U.S.C. 154(b) by 31 days.

(21) Appl. No.: 14/095,149

(22) Filed: Dec. 3, 2013

(65) Prior Publication Data
US 2015/0104689 A1 Apr. 16, 2015

Related U.S. Application Data

(60) Provisional application No. 61/889,436, filed on Oct. 10, 2013.

(51) Int. Cl.
*H01M 2/20* (2006.01)
*H01R 13/193* (2006.01)
*H01M 2/10* (2006.01)
*H01M 10/48* (2006.01)

(52) U.S. Cl.
CPC ............ *H01M 2/204* (2013.01); *H01M 2/1077* (2013.01); *H01M 2/206* (2013.01); *H01R 13/193* (2013.01); *H01M 2/1027* (2013.01); *H01M 10/482* (2013.01); *H01M 10/486* (2013.01); *H01M 2200/103* (2013.01); *H01M 2220/20* (2013.01); *H01M 2220/30* (2013.01)

(58) Field of Classification Search
CPC . H01M 2/204; H01M 2/206; H01M 2220/30; H01M 2220/20; H01R 13/193
USPC .......................................................... 429/123
See application file for complete search history.

(56) References Cited

U.S. PATENT DOCUMENTS 5,127,849 A * 7/1992 Karl et al. ...................... 439/500
5,473,242 A * 12/1995 McKenna ...................... 320/113

(Continued)

OTHER PUBLICATIONS

Notification of Transmittal of the International Search Report and the Written Opinion of the International Searching Authority, mailed Apr. 28, 2014, from International Application No. PCT/US2013/072814, filed Dec. 3, 2013, "Modular Battery System and Components".

*Primary Examiner* — Karie O'Neill Apicella
(74) *Attorney, Agent, or Firm* — Hamilton, Brook, Smith & Reynolds, P.C.

(57) ABSTRACT

A battery cell connector for a battery module includes a pair of cantilevered arms and base portions that are linked at the base portion by a bridge. An interconnect board for connecting a plurality of battery cells includes a circuit board and a plurality of battery cell connectors. A battery block system includes a battery block that has a tray and a plurality of battery cells, and an interconnect board in mating relationships with the tray. A battery system includes first and second bus bars, a first and second pluralities of battery cells, and an interconnect board having a plurality of battery cell connectors linking the first and second plurality of battery cells.

23 Claims, 23 Drawing Sheets

(56) References Cited

U.S. PATENT DOCUMENTS

| | | |
|---|---|---|
| 6,302,727 B1 | 10/2001 | Fedorjaka |
| 8,483,886 B2 | 7/2013 | Onnerud et al. |
| 8,642,195 B2 | 2/2014 | Elia et al. |
| 2007/0026315 A1 | 2/2007 | Lampe-Onnerud et al. |
| 2009/0297937 A1 | 12/2009 | Lampe-Onnerud et al. |
| 2009/0320277 A1 * | 12/2009 | Barrella et al. .............. 29/623.1 |

* cited by examiner

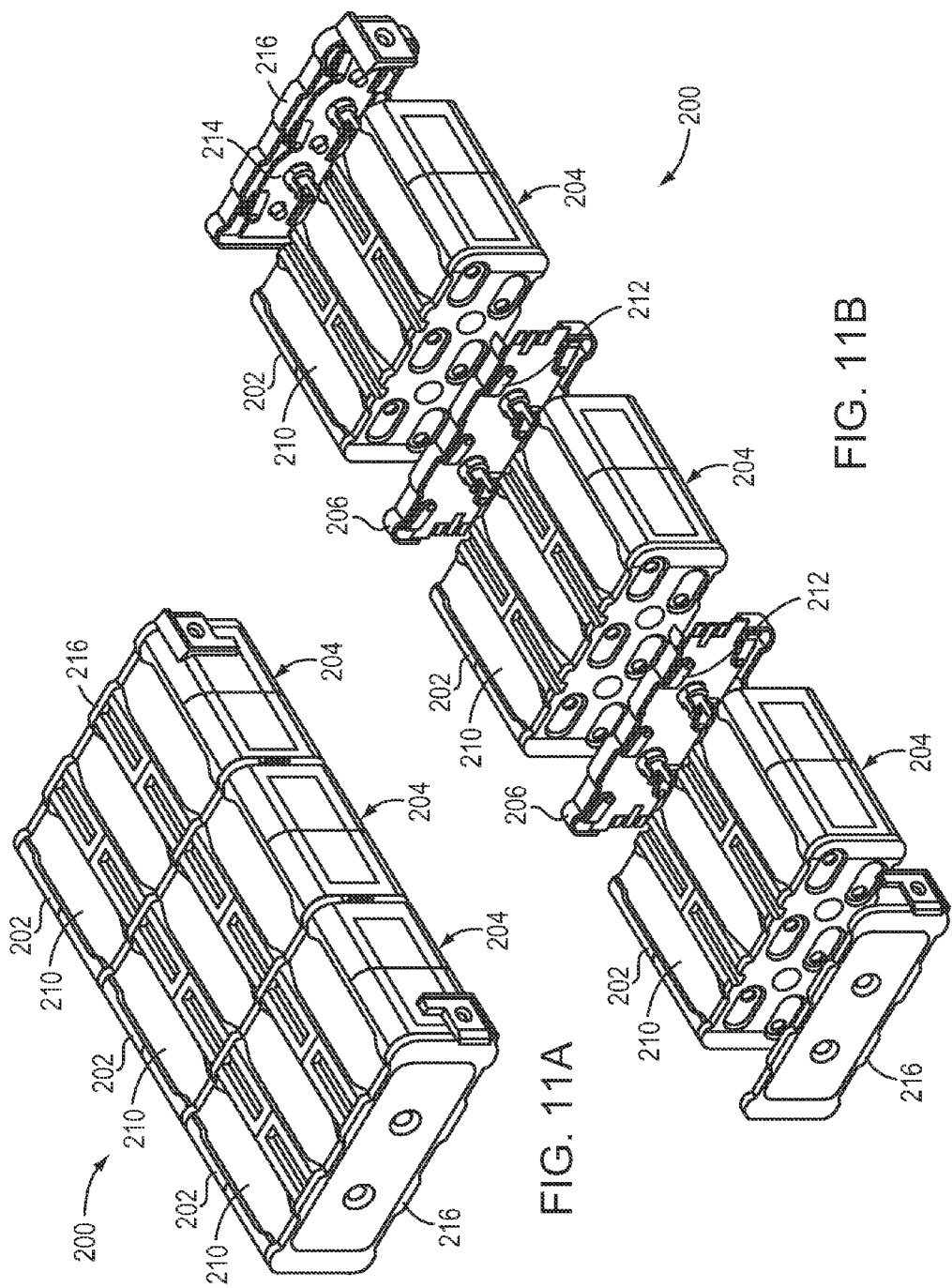

MODULAR BATTERY SYSTEM AND COMPONENTS

RELATED APPLICATION

This application claims the benefit of U.S. Provisional Application No. 61/889,436, filed on Oct. 10, 2013. The entire teachings of the above application are incorporated herein by reference.

BACKGROUND OF THE INVENTION

Many devices, including computers and electric vehicles, are powered by secondary (rechargeable) batteries, such as lithium-ion, nickel cadmium, nickel-metal hydride and lead acid batteries. Many of these devices consume enough electricity to require that conventional secondary batteries be connected collectively in modular form, such as in battery modules of six, eight, or up to several dozen batteries per module. Devices may operate at voltages requiring series connections of cells to achieve this voltage. Parallel connections of cells increase the total energy capacity available. However, secondary batteries, such as the lithium-ion secondary batteries, typically can vary from cell-to-cell and, therefore, must be monitored (for safety, life, discharge and charge limits) during charging and discharging. When necessary, they must be charged separately or selectively discharged in order to balance the cells in each battery module and maximize the collective efficiency and utilization of the individual cells.

Further, some cells have shorter cycle lives than others within a single battery module, and it can be difficult to selectively access and replace individual modules, thereby deleteriously affecting the performance of the battery system and the device as a whole. This, in addition to an inability of many battery systems to identify individual cells failing within a module, often requires that the module be replaced, thereby adding to the expense of maintenance associated with the battery system, and reducing the efficiency and utility of the device relying upon the battery system.

Therefore, a need exists for a modular battery system that overcomes or minimizes the above-referenced problems.

SUMMARY OF THE INVENTION

The invention generally is directed to a battery cell connector, an interconnect board for connecting a plurality of battery cells, a battery block system, and a battery system.

In one embodiment, the invention is a battery cell connector that includes a pair of cantilevered arms in spaced relation to each other. Each arm has a base portion and a cantilevered portion. Each base portion defines an edge portion, wherein each cantilevered portion extends from its base portion, and the cantilevered portions are splayed away from each other with distance from their respective base portions. A bridge links the arms at the base of the arm, and supports the arms in spaced relation to each other at the edge portion of each base portion. The base portions of the bridge together define a U-shape in a plane that is transverse to a major longitudinal axis of the at least one arm.

In another embodiment, the invention is an interconnect board for connecting a plurality of battery cells. The interconnect board includes a circuit board including at least one electrically-conductive channel and a plurality of battery cell connectors at the circuit board. At least a portion of the battery cell connectors are in electrical communication with each other through the electrically-conductive channel. Each battery cell connector includes a pair of terminals on opposite sides of the circuit board that are in electrical communication with each other. At least a portion of the battery cell connectors each include a pair of cantilevered arms in spaced relation to each other. Each arm has a base portion and a cantilevered portion. Each base portion defines an edge portion and each cantilevered portion extends from its base portion. The cantilevered portions splay away from each other with distance from their respective base portions. A bridge links the arms at the base of the arm, and supports the arms in spaced relation to each other at the edge portions of each base portion. The base portions of the bridge together define a U-shape in a plane that is transverse to a major longitudinal axis of at least one arm.

In still another embodiment, the invention is a battery block system that includes a battery block and an interconnect board. The battery block includes a tray and a plurality of battery cells. The plurality of battery cells are assembled within the tray, wherein first terminals of the plurality of the battery cells are aligned in a first plane at a first end of the battery block and second terminals of each of the plurality of battery cells are aligned in the second plane at a second end of the battery block. The interconnect board is in mating relationship with the tray. The interconnect board includes a plurality of battery cell connectors, wherein each battery cell connector includes a pair of terminals on opposite sides of the interconnect board that are in electrical communication with each other.

In yet another embodiment, the invention is directed to a battery system that includes a first bus bar, a plurality of battery cells connected in parallel to the first bus bar at respective first terminals, a second bus bar, a second plurality of battery cells connected in parallel to the second bus bar and an interconnect board. The second plurality of battery cells is connected in parallel to the second bus bar at respective first terminals, each of the battery cells of the first plurality of cells being connected in series to a battery cell of the second plurality of battery cells, thereby enabling electrical current flow between the first and second bus bars via plural series connections between the first and second pluralities of battery cells. The interconnect board has a plurality of battery cell connectors that provide electrical communication between at least one pair of battery cells of the first and second pluralities of a battery cells, and further includes an electrically-conductive channel connecting the plurality of battery cell connectors.

In still another embodiment, the invention is a battery block system that includes a battery block and two connector bus bars. The battery block includes a tray and a plurality of battery cells. The plurality of battery cells are assembled within the tray, wherein first terminals of the plurality of the battery cells are aligned in a first plane at a first end of the battery block and second terminals of each of the plurality of battery cells are aligned in the second plane at a second end of the battery block. A connector bus bar is in mating relationship with the tray on each end of the block. The connector bus bar includes a plurality of battery cell connectors, each of which connects a battery cell to the connector bus bar.

The invention provides many advantages. For example, the battery cell connector of the invention can be conveniently attached to a circuit board without requiring assembly of the connector during attachment to the circuit board. In addition, the cantilevered arms of the battery cell connector can provide electrical contact between the battery cells without requiring a permanent or semi-permanent mechanical connection, such as solder, weldment, bonding, or permanent mechanical fastening, thereby enabling the battery cells be easily assembled and separated. Further, the battery cell connectors of the invention are easily fabricated from a single, continuous piece of metal, thereby eliminating the electrical resistance inherent in the interfaces between conductors. This also improves the reliability of the connection.

The interconnect board of the invention includes a circuit board of at least one electrically-conductive channel that enables features including cell balancing and monitoring of battery cells connected to the circuit board. The monitoring of battery cells can include, for example, the voltage and temperature of the individual battery cells. Individual monitoring of cells in a plurality of battery cells, such as the plurality of cells of a battery module, enables identification of individual cells that require replacement while the battery module is in operation, and without requiring removal of the entire battery module and individual testing of battery cells of the module.

The battery block system of the invention includes a battery block that includes a tray and a plurality of battery cells, and an interconnect board in mating relationship with the tray. The tray, with the batteries, are easily separated from the interconnect board as a unit, and easily substituted or reassembled to form a new battery block system, as necessary. In addition, the battery system of the invention, like the battery block system of the invention, can be easily assembled and disassembled, and can be stacked to form a battery system that employs several stacked trays of battery cells, all connected through interconnect boards between each tray, thereby enabling the formation of a battery system with any number of trays of battery cells, and which can be disassembled, as necessary, to remove and replace individual trays of battery cells or, even, individual cells within battery trays, said individual cells having been monitored through the interconnect board of the battery system. Other advantages of Applicants' invention will be made apparent with description of the various exemplary embodiments set forth below.

The disclosed busbar and interconnect design for large format batteries with cells in parallel and in series also has the following key features and attributes:

1. The design minimizes the current density, resistance, and voltage drop in the busbars and interconnects of the design as a result of a number of features including one or more of the following:
   a. The direction of current flow is kept parallel between cells connected in parallel and from parallel array to parallel array as the battery voltage is increased by the series connections of these arrays.
   b. The current path between the series connects is minimized by stacking cells so the current flow is through the thickness of the interconnect rather than through the cross-section of a longer interconnect.
   c. This approach eliminates the increase in current that occurs when individual cells are connected in parallel and the current is collected at the ends of the array. This approach minimizes the resistance, voltage drop, and temperature rise in the busbar-interconnect network. The temperature of the busbar-interconnect will be more uniform due to the uniformity of current density in the network. Lower energy losses through the busbar-interconnects lessens heat into the cells.
   d. The terminal (collector) busbars, which collect the current at the positive and negative terminals, can be designed with the appropriate cross-section to maintain the current density and temperature as the total current increases.

2. This design allows fusing to be designed integrally into the busbar connections between cells because of the parallel direction of current flow between cells connected in series. The busbar cross-section between cells in parallel can be designed to conduct normal balancing current between cells, but to act as a fuse in safety situations, i.e., when a single cell shorts either from an internal short or penetration of an external mechanical element (a nail), where very high currents will flow from adjacent cells to the shorted cell.
   a. Activation of the fuses around the shorted cell will electrically isolate the cell and prevent the influx of high currents that could push the cell into thermal runaway.
   b. Isolation of the cell could allow continued use of the battery, thereby increasing the fault-tolerance of the system.

3. The design of the busbar and interconnect allows parallel arrays of cells or blocks, i.e. 6, 8 or more cells in parallel building block units, to be connected in parallel and in series by mechanical connections.
   a. The mechanical interconnection of blocks simplifies assembly and maintenance of the system.
   b. Terminals of the individual cells can be designed to facilitate these mechanical interconnections. Spring loaded connections would be one approach to maintain contacts in automotive environments with vibration and shock.
   c. Scalability is enhanced because of: 1) the parallel flow of current, i.e., current density in interconnects and the busbar does not change with the number of cells in parallel and 2) fusing at the cell level for protection from in-rush currents in the event that a single cell develops a short.

4. The design can be further enhanced by the incorporation of circuitry in the busbar-interconnect network. Circuitry additions could include:
   a. Wiring to sense voltage.
   b. Sensors for monitoring temperature and stress on can surfaces. The latter can provide a measure of changes in cell thickness.
   c. Information from voltage, temperature, and other sensors could be collected on a built-in Controller Area Network (CAN) bus or other communications network.

The design achieves the above mentioned advantages while keeping an efficient utilization of both space (volume) and weight; i.e. minimizing lowering of energy density, a key attribute of batteries. The efficient space and weight utilization advantage occurs both with block and module assemblies using the design.

BRIEF DESCRIPTION OF THE DRAWINGS

FIG. 11A is a perspective view of an embodiment of the battery system (module) of the invention having three blocks of battery cells.

FIG. 11B is an exploded view of the battery system of FIG. 11A.

DETAILED DESCRIPTION OF THE INVENTION

Figure 1A:
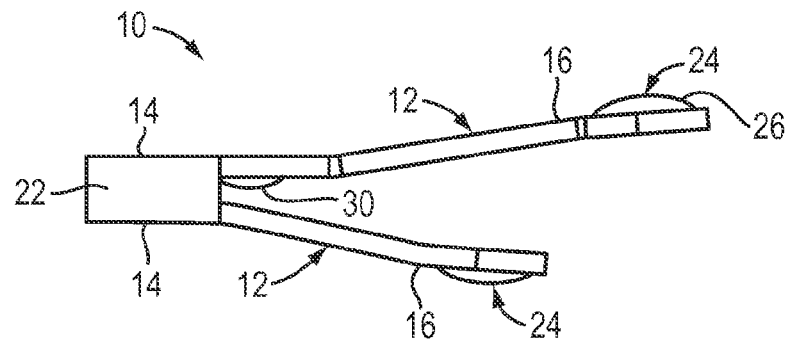
FIG. 1A is a side view of one embodiment of a battery cell connector of the invention.

The teachings of all patents, published applications and references cited herein are incorporated by reference in their entirety.

The invention generally is directed to a battery cell connector, an interconnect board for connecting a plurality of cells, a battery block system and a battery system for use with secondary (rechargeable) batteries, such as lithium ion, nickel cadmium, nickel-metal hydride and lead acid batteries. The various embodiments of the invention facilitate convenient assembly of multiple batteries, blocks of batteries, battery modules and systems that enable monitoring of subunits of the battery systems, such as individual blocks or modules of the battery system, and simplified removal and replacement of blocks and modules, as necessary, when monitoring indicates that such replacement is necessary.

As defined herein, a "battery block," is a collection of cells constrained together in a predetermined orientation.

Also, as defined herein, a "battery module" is the collection of battery blocks connected together in series and/or parallel and provides for a positive and negative terminal.

In one embodiment, the invention is a battery cell connector 10, shown in FIGS. 1A-1D. As shown therein, battery cell connector 10 includes a pair of cantilevered arms 12 in spaced relation to each other. Each cantilevered arm 12 has base portion 14 and cantilevered portion 16. Each base portion 14 defines edge portion 18. Each cantilevered portion 16 extends from base portion 14. Cantilevered portions 16 splay away from each other with distance from their respective base portions 14.

Figure 1B:
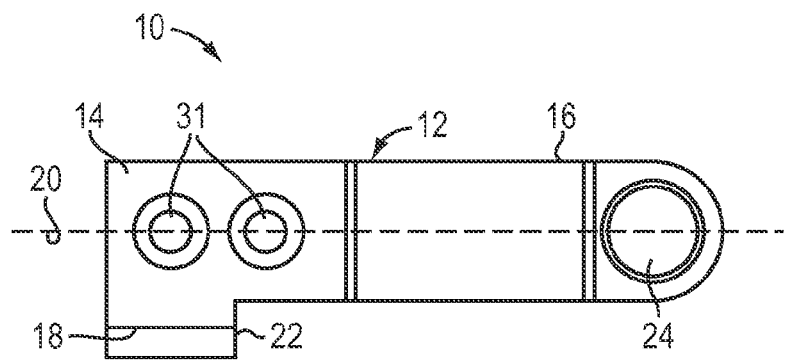
FIG. 1B is a plan view of the battery cell connector of FIG. 1A.

Each cantilevered arm 12 has major longitudinal axis 20. As shown in the embodiment of FIGS. 1A-1D, major longitudinal axes 20 are substantially parallel to each other when viewed along a plane passing through both cantilevered arms 12, as shown in FIG. 1B. In this embodiment, cantilevered arms 12 overlap each other when viewed along a plane passing through both cantilevered arms, as can be seen in FIG. 1B.

Figure 1C:
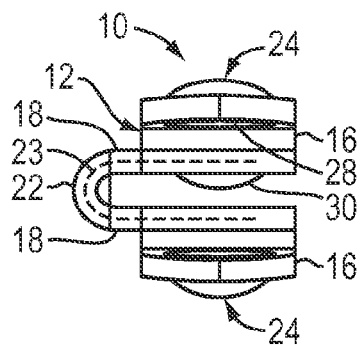
FIG. 1C is an end view of the battery cell connector of FIG. 1A.

Bridge 22 links cantilevered arms 12 at base 14 of each cantilevered arm 12, and supports cantilevered arms 12 in spaced relation to each other at edge portion 18 of each base portion 14. As can be seen in FIG. 1C, base portion 14 and bridge 22 together define a U-shape 23 in a plane that is transverse to major longitudinal axis 20 of at least one cantilevered arm 12.

In one embodiment, cantilevered arms 12 include protrusions 24 for contacting a terminal of a battery cell. In a specific embodiment, protrusion 24 is a contact at an end of the cantilevered arm 12 distal to base portion 14. The contact has surface 26 that is raised from cantilevered arm 12. Protrusion 24 is fixed to cantilevered arm 12 or is integral to cantilevered arm 12. In one embodiment, protrusion 24 is fixed to cantilevered arm 12 by a suitable method, such as by soldering. In another embodiment, protrusion 24 of cantilevered arm 12 has corresponding depression 28 on the side of cantilevered arm 12 opposite protrusion 24.

Figure 1D:
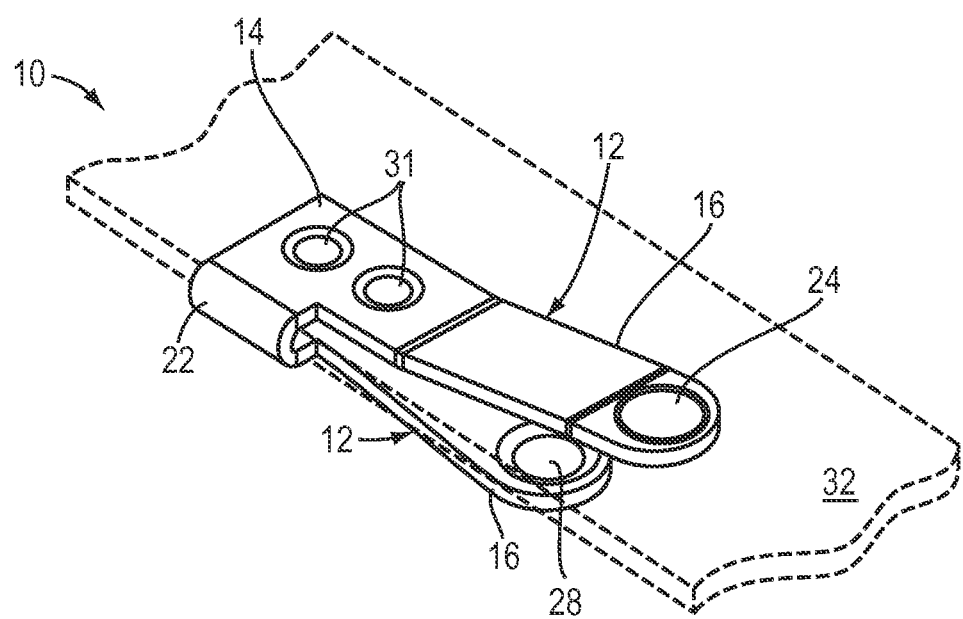
FIG. 1D is a perspective view of the battery cell connector of FIG. 1A, shown connected to a circuit board, represented in outline.
Figure 2:
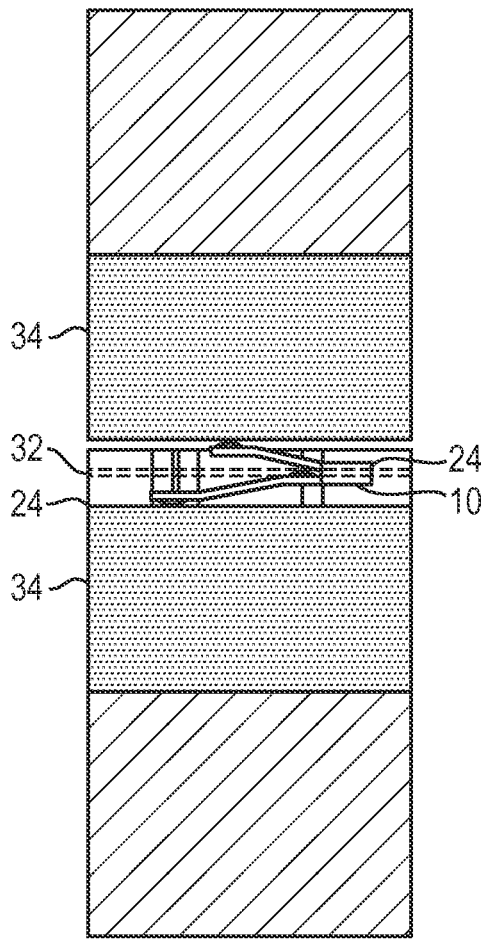
FIG. 2 is a side view, shown in part, of a cell interconnect of the invention connecting two battery cells in series.

Protrusion 30 extends within base 14 for securing battery cell connector 10 to a circuit board. As shown in FIG. 1D, circuit board 32 (shown in outline) occupies the space defined by base 14 and is secured to battery cell connector 10 by pressure exerted on circuit board 32 by base 14 between protrusion 30 and the portion of base 14 facing protrusion 30. The pressure exerted by base 14 may be sufficient to secure battery cell connector 10 to circuit board 32, or may be supplemented by another attachment means, such as soldering. Typically, depressions 31 at base 14 correspond to protrusions 30 on the opposite side of base 14. Although two depressions 31 are shown in this example, embodiments may employ any number of depressions and corresponding protrusions, or may be absent of depressions. The protrusions may align with corresponding depressions in circuit board 32 to facilitate securement of battery cell connector 10 to circuit board 32. As can be seen in FIG. 1D, protrusion 30 is employed to assist in securing battery cell connector 10 to a circuit board 32 (shown in outline) at a contact pad (not shown) of circuit board. Protrusions 24 at distal ends of cantilevered arms 12 contact terminals of batteries 34, as can be seen in FIG. 2, thereby providing electrical contact between poles of two opposing batteries 34.

Preferably, battery cell connector 12 is of a single, continuous, electrically-conductive material. Battery cell connector 12 is formed of a suitable material. Examples of suitable materials of battery cell connecter include steel, copper or a copper alloy. An example of a suitable copper alloy is a beryllium copper alloy. In one embodiment, the material of battery cell connecter 12 is sufficient to exert a force that provides a contact interface voltage below the contact material melting voltage. As defined herein, a "contact interface voltage below the contact material melting voltage," means that the voltage drop across the contact is not sufficient enough to cause melting of the contact material. Typically, battery cell connector 12 will exhibit a spring constant, whereby application of external pressure forcing cantilevered portions of battery cell connecter together will be opposed by a force of the cantilevered arms that will cause the cantilevered arms to return to their original positions after the external force directing them together has been removed. In one embodiment, the pair of cantilevered arms of the battery cell connector has a spring constant of at least 4 kgf/mm.

In one embodiment, battery cell connector 12 is plated with a suitable material. Examples of suitable plating materials include at least one member selected from the group consisting of silver, gold, tin, platinum and palladium. Alternatively, coining of alloys such as silver-nickel onto the surface may be employed.

Figure 3A:
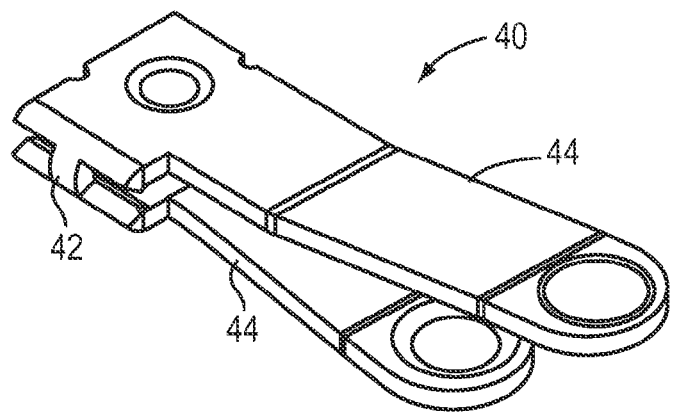
FIG. 3A is a perspective view of one embodiment of a battery cell connector of the invention including a fusable link.
Figure 3B:
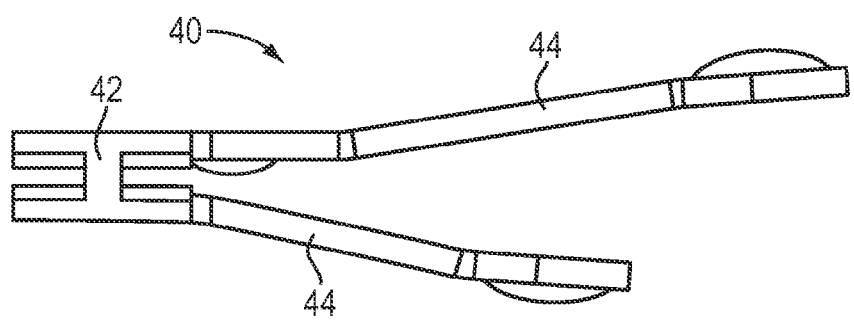
FIG. 3B is a side view of the battery cell connector of FIG. 3A.
Figure 3C:
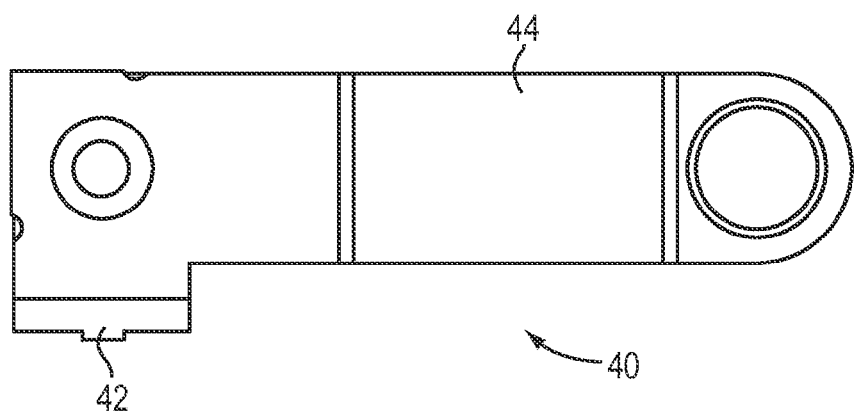
FIG. 3C is a plan view of the battery cell connector of FIG. 3A.

In a specific embodiment, cantilevered arms 12 and bridge 22 have an essentially uniform cross-sectional area. In another embodiment, shown in FIGS. 3A-3C, battery cell connector 40 includes fusible link 42. Fusible link 42 acts as the bridge linking cantilevered arms 44. Fusible link 42 is formed of a suitable material, such as steel, copper or a copper alloy. Fusible link 42 is designed to fail, thereby electrically separating cantilevered arms 44, when the current is high enough to melt the contact material and create an open circuit. In an example embodiment, battery cell connector 40 can conduct a current of at least about 10 amps.

Typically, fusible link 42 will have a cross-sectional area less than a cross-sectional area of at least one of the pair of cantilevered arms 44 and the bridge, depending upon where fusible link 42 is placed. For example, the fusible link could be within the cantilevered arm.

Figure 4A:
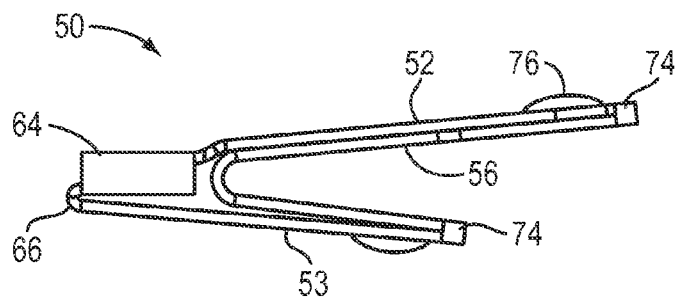
FIG. 4A is a side view of another embodiment of a battery cell connector of the invention including a leaf spring component.
Figure 4B:
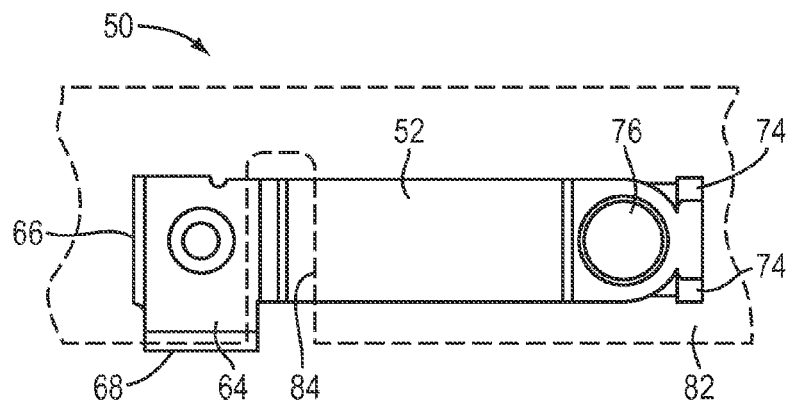
FIG. 4B is a plan view of the battery cell connector of FIG. 4A, shown connected to a circuit board, represented in outline.
Figure 4C:
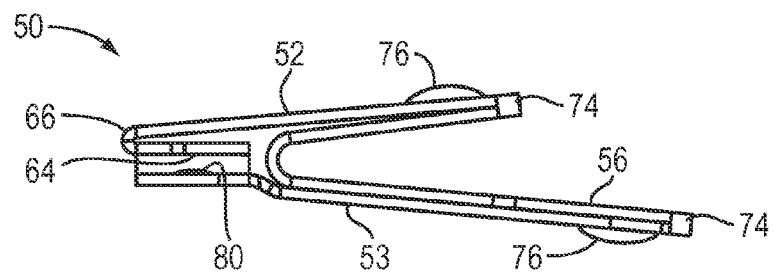
FIG. 4C is a side view of the battery cell connector of FIG. 4A, shown from the opposite direction of the view of FIG. 4A.
Figure 4D:
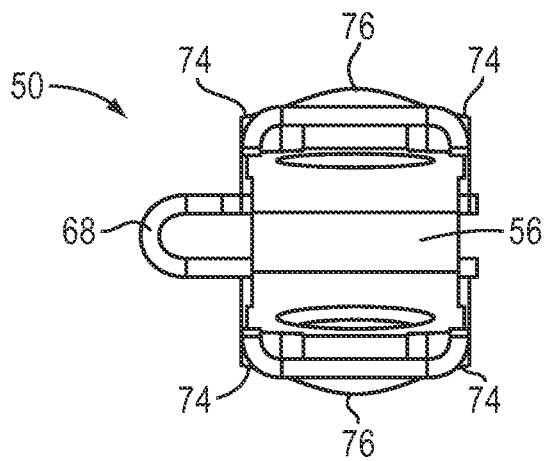
FIG. 4D is an end view of the battery cell connector FIG. 4A.
Figure 4E:
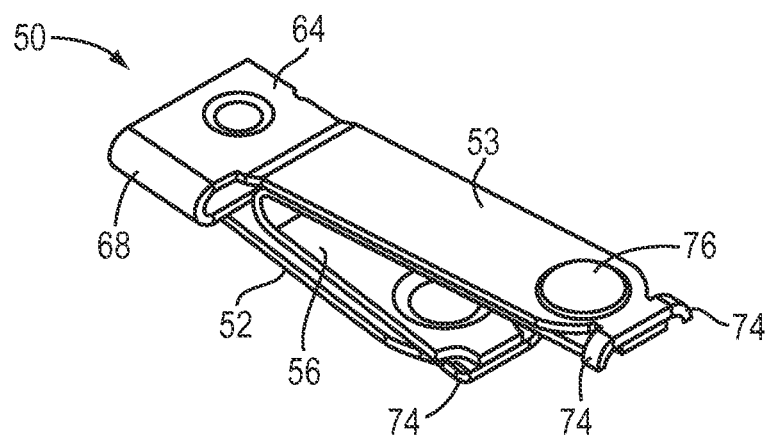
FIG. 4E is a perspective view of the battery cell connector of FIG. 4A.

In yet another embodiment, shown in FIGS. 4A-4B, battery cell connector 50 includes cantilevered arms 52, 53 connected by bridge 54 and further includes leaf spring 56 between cantilevered arms 52, whereby leaf spring 56 modifies the apparent spring constant of cantilevered arms 52. Leaf spring 56 is formed of a suitable material, such as steel, stainless steel, aluminum alloy, or copper alloy. Optionally, as shown in FIG. 4C, battery cell connector 50 includes at least one cantilevered arm 52 folded about itself at base 64. Further, fold 66 at base 64 of cantilevered arm 52 is at an end of bridge 68 opposite to that of cantilevered arm 53. In an alternate embodiment, both cantilevered arms are folded.

Leaf spring 56 is fixed at distal ends by tabs 74 or by interlocking with 52. Protrusions 76 are at ends of cantilevered arms 70 for contacting opposite poles of batteries electrically connected in series. Further, protrusion 80 at base 64 cantilevered arms 52, 53 is adapted to provide electrical connection of battery cell connecter 60 to circuit board 82, shown in outline in FIG. 4B. In addition, because of the presence of leaf spring 56, slot 84 is provided in circuit board 82, as shown in FIG. 4B, to provide space for leaf spring 56, while still allowing the battery cell connector 50 to span circuit board 82 at base 64.

Figure 5A:
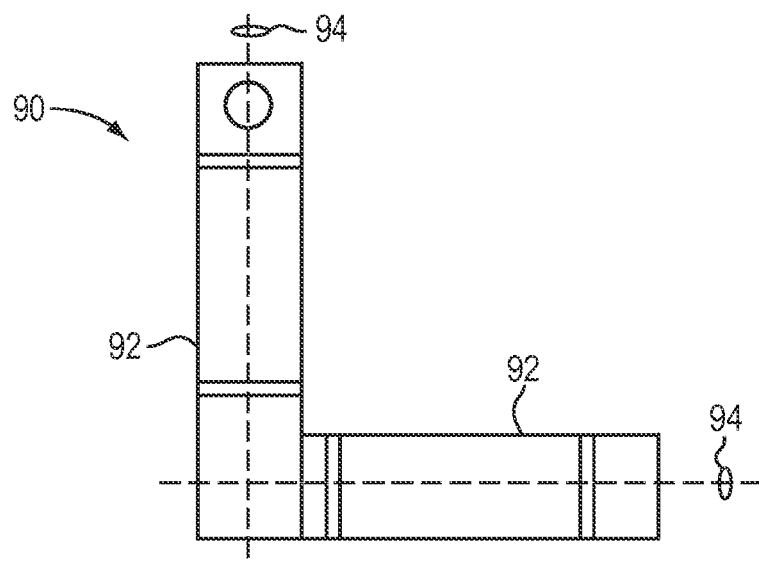
FIG. 5A is a plan view of another embodiment of the battery cell connector of the invention.
Figure 5B:
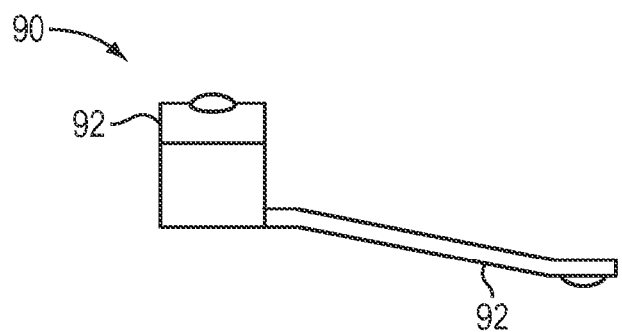
FIG. 5B is a side view of the battery cell connector of FIG. 5A.
Figure 5C:
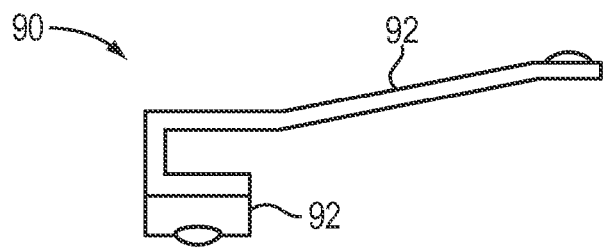
FIG. 5C is another side view of the battery cell connector of FIG. 5A, shown rotated 90° from the view shown in FIG. 5B.
Figure 6A:
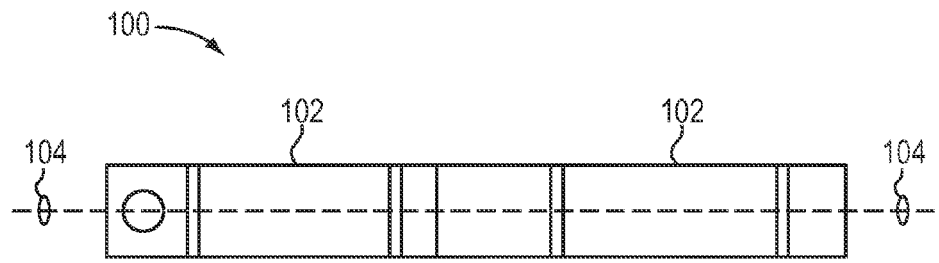
FIG. 6A is a plan view of still another embodiment of the battery cell connector of the invention.
Figure 6B:
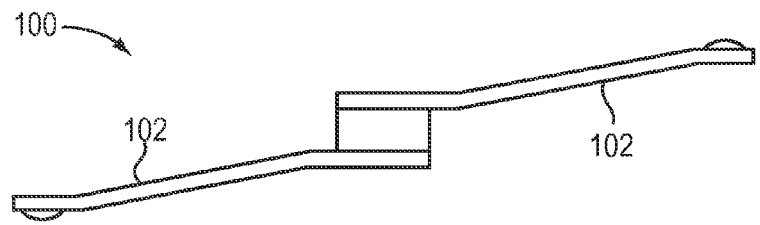
FIG. 6B is a side view of the battery cell connector of FIG. 6A.
Figure 6C:
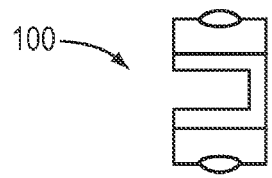
FIG. 6C is an end view of the battery cell connector of FIG. 6A, shown rotated 90° from the view shown in FIG. 6B.
Figure 6D:
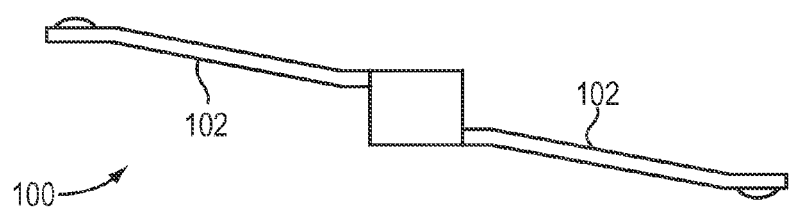
FIG. 6D is a side view of the battery cell connector of FIG. 6A, shown rotated 180° from the view shown in FIG. 6B.

In other embodiments, the battery cell connector includes cantilevered arms 92 that extend along major longitudinal axes that are at angles with each other. For example, as shown in FIGS. 5A-5C, battery cell connector 90 includes cantilevered arms 92 that extend along major longitudinal axes 94 that are at right angles to each other. In another embodiment, shown in FIGS. 6A-6D, battery cell connector 100 includes cantilevered arms 102 that extend along a single major longitudinal axis 104 in a plan view, but in opposite directions, as is shown in FIG. 6A.

Figure 7A:
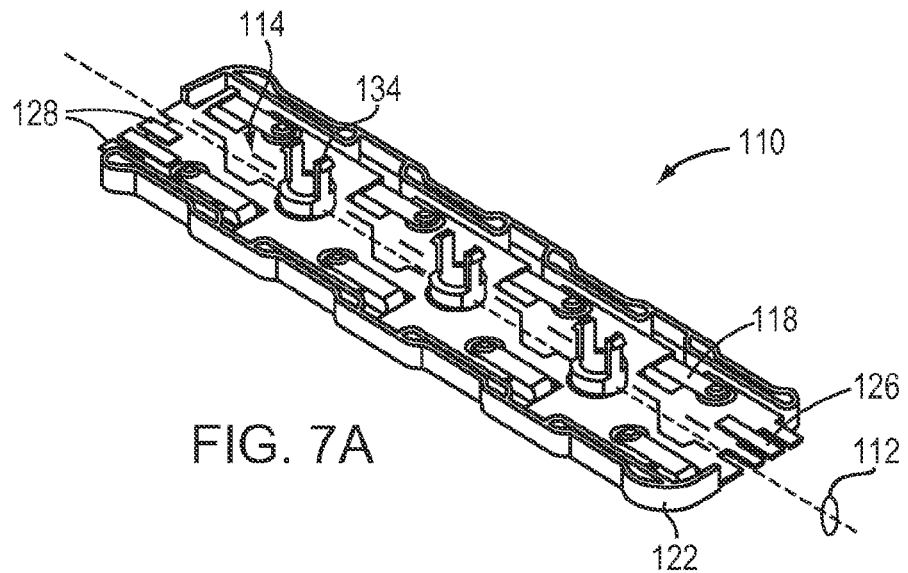
FIG. 7A is a perspective view of an interconnector board of the invention for connecting a plurality of battery cells, including a circuit board and a housing.
Figure 7B:
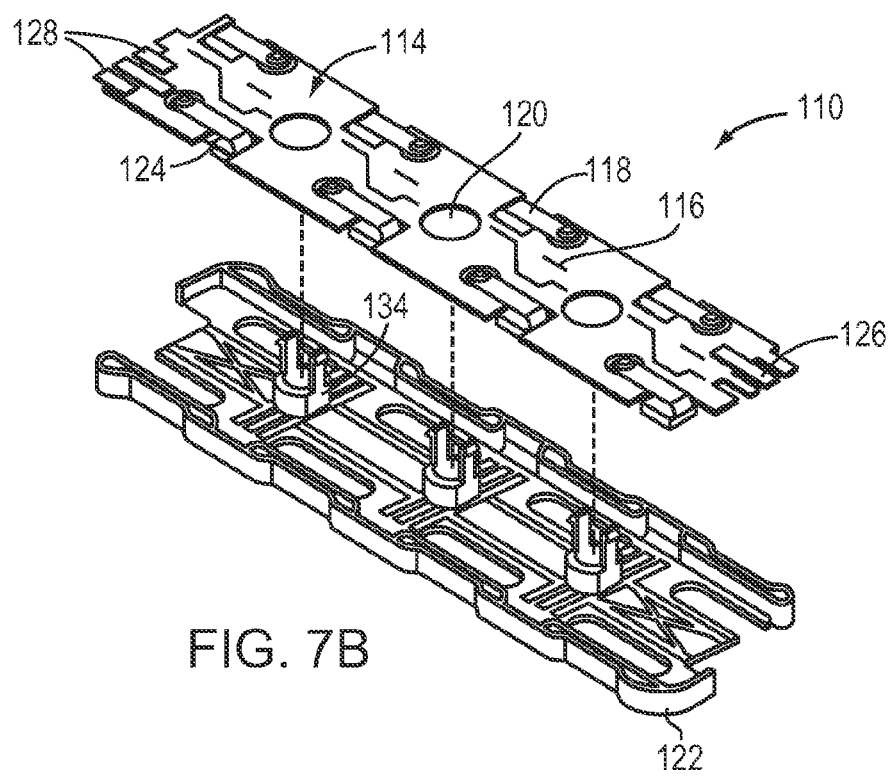
FIG. 7B is an exploded view of the interconnect board of FIG. 7A.
Figure 7C:
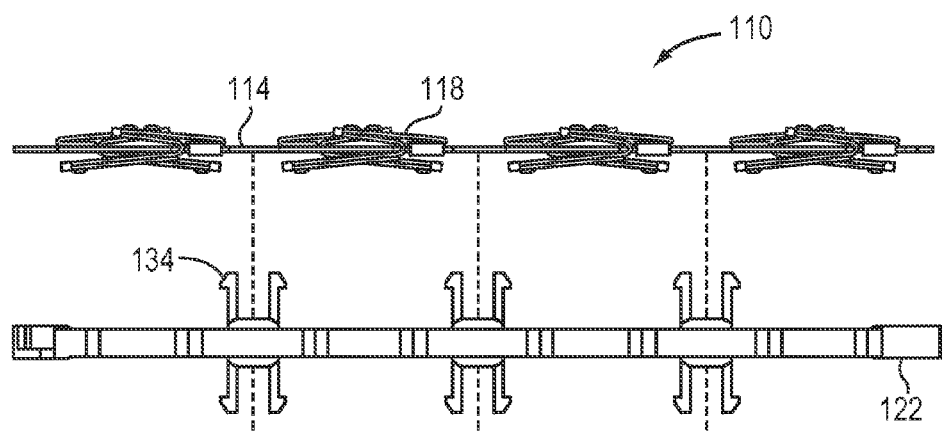
FIG. 7C is a side view of an interconnect board of the invention having battery cell connectors that each employ a leaf spring and a housing.
Figure 7D:
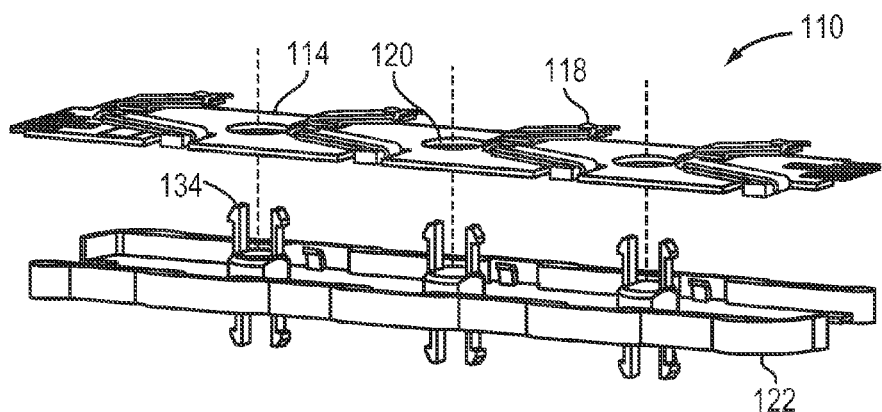
FIG. 7D is a perspective view of the embodiment of the invention of FIG. 7C.

In another embodiment, shown in FIGS. 7A-7D, the invention is interconnect board 110 for connecting a plurality of battery cells. Interconnect board has major longitudinal axis 112. Interconnect board 110 includes circuit board 114 having at least one electrically-conductive channel 116 (FIG. 7B), and plurality of battery cell connectors 118 at circuit board 114, at least a portion of which are in electrical communication with each other through electrically-conductive channel 116. Circuit board 114 defines openings 120. As shown in FIG. 7A, circuit board 114 rests within housing 122. Housing 122 is fabricated of a suitable material, such as polyphenylene-sulfide, polycarbonate, acrylonitrile butadiene styrene with or without fiber additives (glass, carbon, etc). Housing 122 includes posts 134 extending therefrom on either side of housing 122. Posts 134 extend through openings 120 of circuit board 114 when circuit board 114 and housing 122 are assembled, as shown in FIG. 7A. Each battery cell connector 118 includes pair of terminals 126 on opposite sides of circuit board 114 that are in electrical communication with each other. Examples of suitable battery cell connectors 118 are those shown in FIGS. 1A-1D, 3A-3C, 4A-4E, 5A-5C and 6A-6D.

Figure 8:
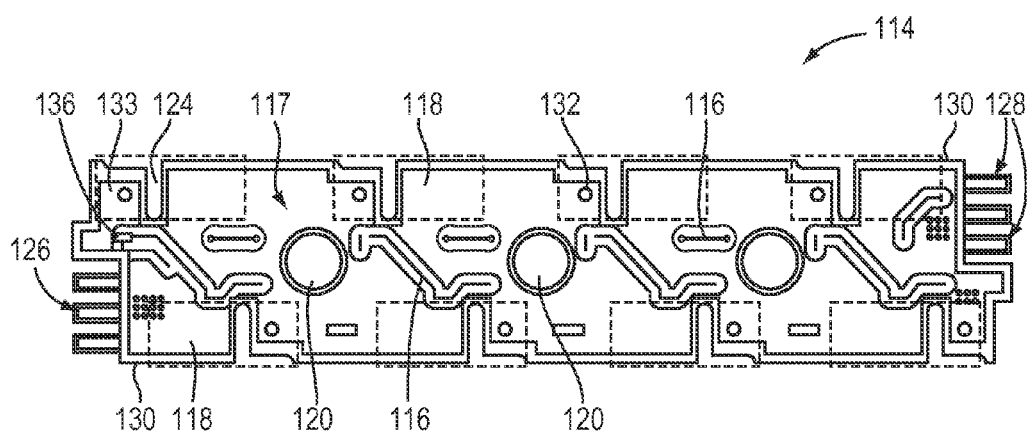
FIG. 8 is a plan view of the circuit board of FIGS. 7A and 7B.

As shown in FIG. 8, electrically-conductive channel 116 of circuit board 114 connects at least a subset of plurality of battery connectors 118 (shown in outline), and may connect at least a subset of plurality of battery connectors for one or more of cell balancing, temperature monitoring and voltage monitoring, as well as connection to one or more terminals 126. Electrically conductive channel 116 may also include at least one fusible link integrated into the etching of channel 116 between at least a subset of plurality of battery connectors 118. In a particular embodiment, at least one fusible link electrically isolates at least one battery cell 118 from other battery cells to which it is electrically connected. Fusible link will isolate the at least one battery cell from other battery cells in response to conduction of a current greater than a threshold current.

Circuit board includes slots 124 for accommodation of leaf springs of battery cell connectors, such as for leaf spring 56 of battery cell connector 50 of the invention, shown in FIGS. 4A-4E. Contact pads 132 of circuit board 114 contact protrusions of battery cell connectors, such as protrusions 30, 80 of battery cell connectors 10, 50 FIGS. 1A-1E, and 4A-4E.

In one embodiment, electrically-conductive channel 116 includes or is electrically connected to a circuit that balances battery cells connected with each other, such as battery cells connected in parallel with each other through battery cell connectors 118. Optionally, circuit board 114 includes an electrical circuit at, or in electrical communication with a circuit through terminals 126, wherein the circuit indicates voltage of at least a subset of the battery cells in electrical communication with each other. In one embodiment, the electrical circuit to which circuit board 114 is linked includes a voltage-monitoring circuit. Optionally, the circuit board 114 may include parallel copper layer 117 to balance battery cells connected to battery cell connectors 118 by electrically connecting battery cell connectors 118.

Optionally, circuit board 114 also includes at least two terminals 128 located on at least one of end portions 130 of circuit board 114. A temperature circuit (thermistor) 136 is at, or is in electrical communication with circuit board 114, wherein the temperature circuit 136 indicates the temperature of at least one of the battery cells in electrical communication with circuit board 114 through battery cell connectors 118. Temperature circuit 136 may be connected to battery cell connectors 118 via electrically conductive channel 116. Terminals 128 at circuit board 114 are connected to the temperature circuit 136.

Figure 9:
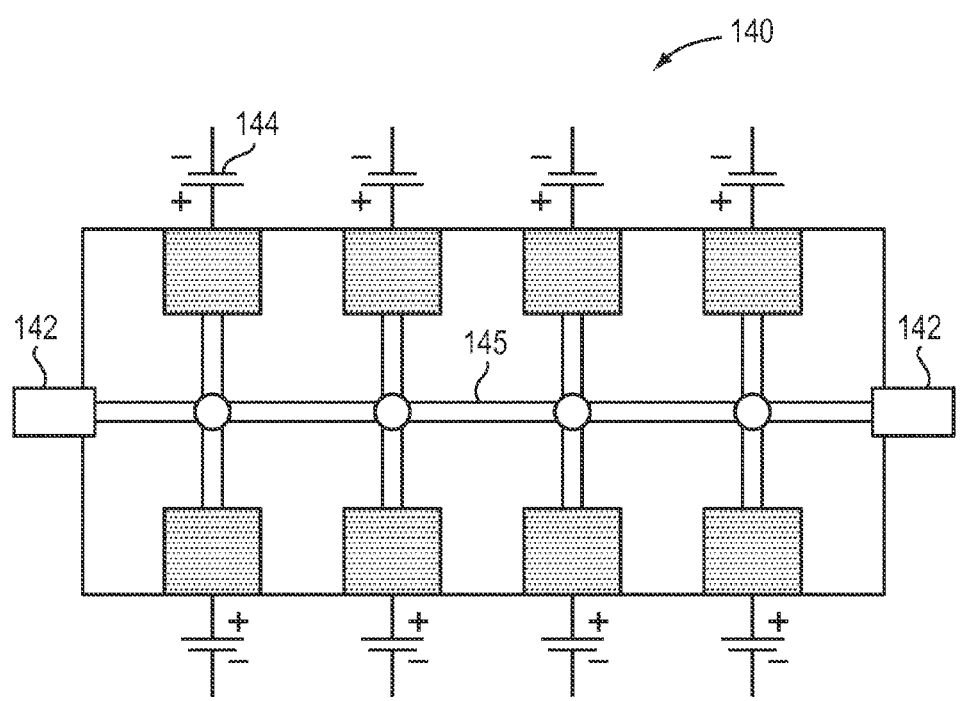
FIG. 9 is a schematic representation of a voltage detection component of the circuit board of FIGS. 7A and 7B.

Circuit 140, represented in the circuit diagram of FIG. 9, shows the electrical network 145 between voltage sense connectors 142 and batteries 144 in electrical communication with battery cell connectors (not shown) at an interconnect board. The network 145 may also enable passive cell balancing and may connect to a thermal circuit or other monitoring circuitry (not shown).

Figure 10A:
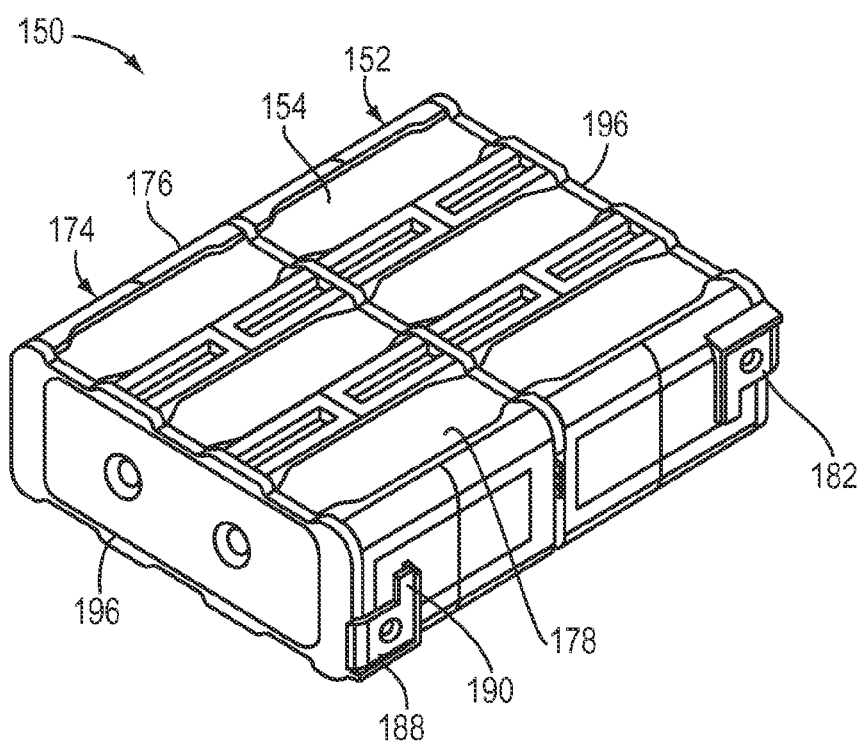
FIG. 10A is a perspective view of one embodiment of a battery system of the invention, including two battery blocks of six batteries each.
Figure 10B:
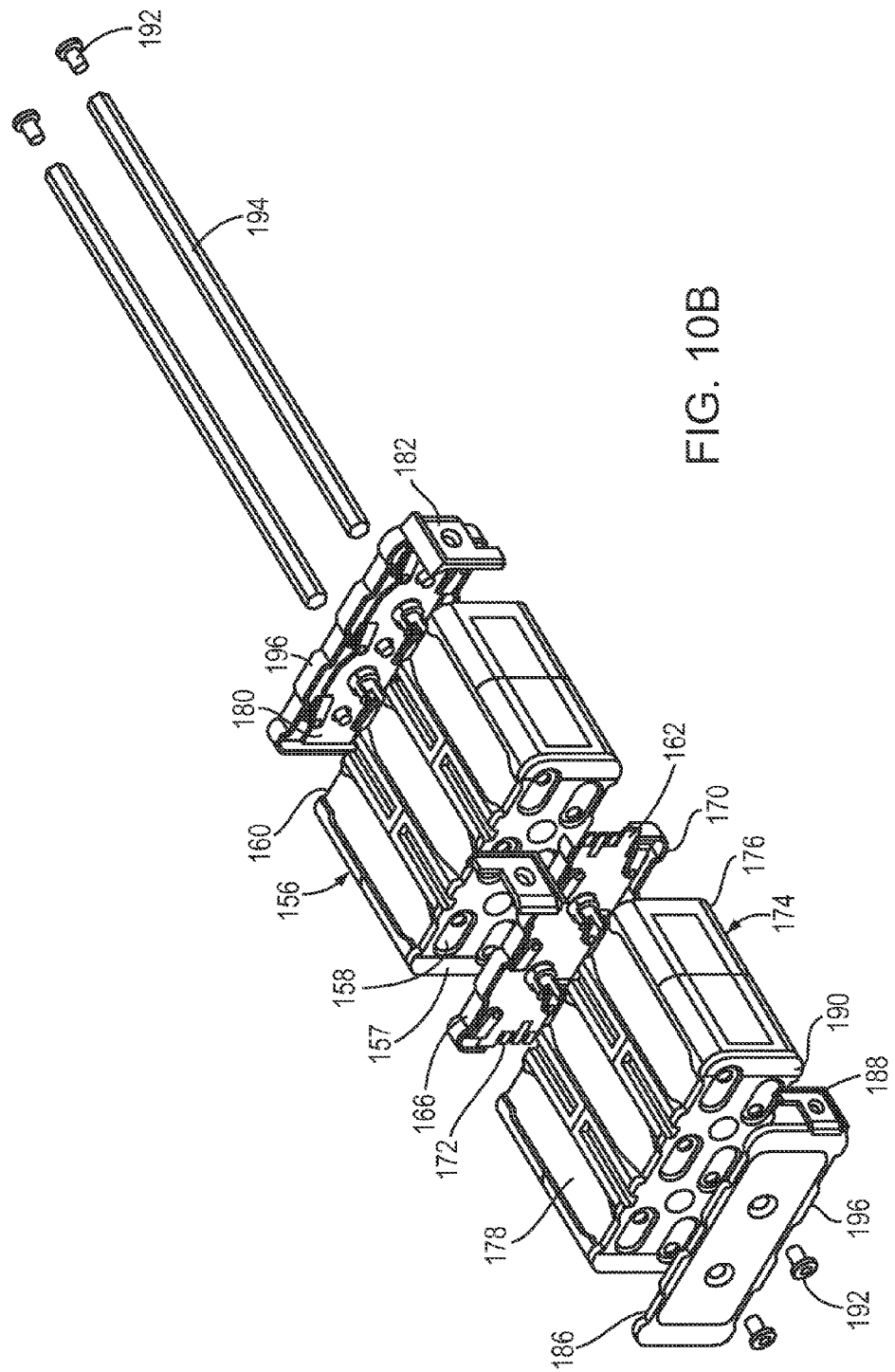
FIG. 10B is an exploded view of the battery system (module) of FIG. 10A.

As can be seen in FIGS. 10A-10B, in one embodiment of the invention battery block system 150 includes first tray 152, which supports plurality of battery cell 154. Plurality of battery cells 154 are assembled within tray 152, wherein first terminals of battery cells 154 are aligned in a first plane at a first end 157 of first battery block 156, and second terminals (not shown) at a second end of first battery block 156 of each of the plurality of battery cells 154 are aligned in a second plane. Interconnect board 162 is shown in FIG. 10B. Interconnect board assembly 162 includes circuit board 164, battery cell connectors 166 and interconnect board housing 170. Circuit board 164 within housing 170 has connected to it plurality of battery cell connectors 166. Each interconnect board 162 includes a number of terminals 172 extending from opposite sides of connectors board housing 170, as shown in FIGS. 7A-7E. Further, each battery cell connector 166 can be a battery cell connector as shown in FIGS. 1A-6D. Interconnect board housing 170 (FIGS. 10A-10B) is in mating relation with interconnect board 162. Interconnect board housing 170 also is in mating relation with second battery block 174 at the first and second planes, whereby battery cells 178 of second battery block 174 can be connected in series to battery cells 154 of first battery block 156 through battery cell connectors 166 of interconnect board 162.

Second tray supports battery cells 178 of second battery block 174 at interconnect board 162, wherein battery cells 154 of first battery block 156 are connected to battery cells 178 of secondary battery block 174 in series through battery cell connectors 166.

First busbar 180 is connected to first battery block 156 opposite interconnect board 162. First busbar 180 connects the plurality of cells of first battery block 156 in parallel at one end of the first and second terminals of battery cells. First busbar 180 includes negative terminal 182 for electrically connecting the battery cells of the battery blocks interconnected by battery block system 150 to an external monitor or other system (not shown) powered by battery block system 150 of the invention.

Second busbar 186 is connected to second battery block supported 174 by tray 176 and is positioned on the opposite side of interconnect board 162 from first busbar 180. Second busbar 186 connects the plurality of cells of second battery block 174 in parallel at one of the first and second terminals of the batteries of second battery block 174. Second busbar 186 includes positive terminal 188 for connection to an external system, such as a motor or other system (not shown) powered by battery block system 150 of the invention. Positive terminal 188 includes tab 190 for monitoring voltage of batteries of the second battery block in cooperation with interconnect board 162.

Battery block system 150 may be adapted to accommodate plurality of battery cells 154 having one or more different cell types. For example, plurality of battery cells 154 may include prismatic 193765-type cells including products such as Swing 5300® or standard cylindrical 18650-type battery cells. In order to accommodate battery cells of different types, battery block system 150 may be modified to accommodate such battery cells, for example by modifying the dimensions of trays 152, 176, interconnect board 162 and busbars 180, 186 in order to properly house and connect to the terminals of a given battery cell type.

Battery block system 150 is held together by threaded screws 192, which are threaded to stringers 194 that extend through openings of busbars 180, 186, trays 152, 176 and interconnect boards 162, as shown in FIGS. 10A and 10B. It is understood that the battery block system of the invention, and the battery system of the invention, can include trays supporting battery blocks having as few as two battery cells, but as many as 4, 6, 8, 10, 12, 14, 16 or more battery cells all, or a portion of which, are connected in parallel by an interconnect board. Further, it is also to be understood that the battery block system and the battery system of the invention can include as few as a tray supporting only a single battery block, but as many as 2, 3, 4, 5, 6, 7, 8 or more battery blocks.

For example, in another embodiment, shown in FIGS. 11A and 11B, battery block system 200 of the invention includes three trays 202 supporting three battery blocks 204 interposed by two interconnect housings 206 which, in turn, house two interconnect boards 208. Battery blocks 204 are connected in series, wherein each battery cell 210 of each battery block 204 is connected to a battery cell similarly positioned within the battery block to which it is connected by a battery cell connector 212. Each tray 202 supports a battery block 204, and each battery cell 210 of each battery block 204 is connected in series to a corresponding battery cell 210 of the adjoining battery block 204. The battery cells of each battery block are connected in parallel for monitoring of temperature and voltage, as discussed above. At either end of the battery blocks connected in series, busbars 214 span in parallel the battery cells 210 of the battery blocks 204 at either end of battery block system 200, thereby providing terminals at the positive and negative ends of the battery blocks 204 connected in series.

Figure 12A:
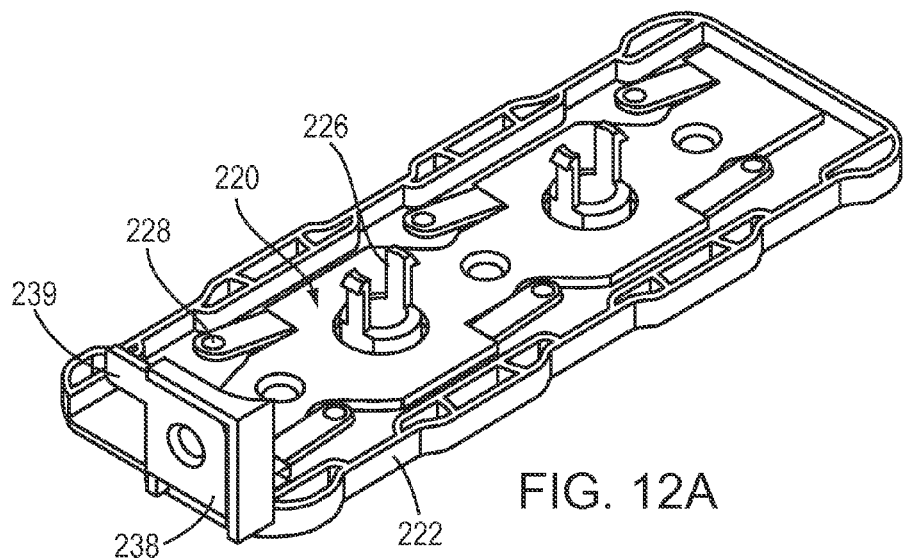
FIG. 12A is a perspective view of a bus bar and bus bar housing of the battery system of FIGS. 10A and 10B.
Figure 12B:
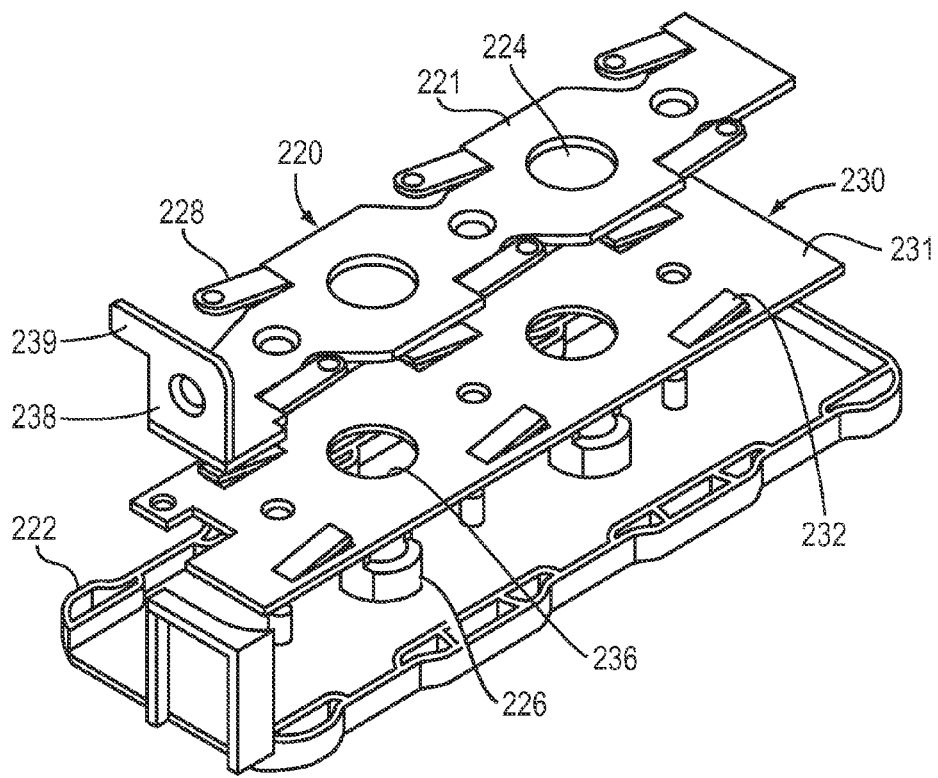
FIG. 12B is an exploded view of the bus bar, bus bar spring plate, and bus bar housing of the battery system of FIG. 13A.

As can be seen in FIGS. 12A and 12B, each busbar 220 is seated within faceplate component 222. Each busbar 220 defines openings 224 through which posts 226 of faceplate component 222 extend in order to form an interlocking relation with the tray adjoining it, as shown, for example, in FIGS. 11A and 11B. Busbar 220 also defines cantilevered arms 228 that extend at an angle from base 221 of busbar 220 and provide electrical connection between batteries of the battery block adjoining busbar 220, as shown, for example, in FIGS. 10A-10B and FIGS. 11A-11B. Busbar 220 also includes terminal 238 and, for the positive terminal of a battery block system, tab 239.

Spring plate 230 (FIGS. 12A-12B) is interposed between busbar 220 and faceplate component 222. Spring plate 230 includes base 231 and spring tabs 232 that abut cantilevered arms 228 of busbar 220 and provide, at least in part, an apparent spring constant to cantilevered arms 228. Spring plate also defines openings 236 through which posts 226 pass. Typically, busbar 228 is formed of a suitable material, such as copper. Spring plate 230 is formed of a suitable material, such as steel.

Figure 13:
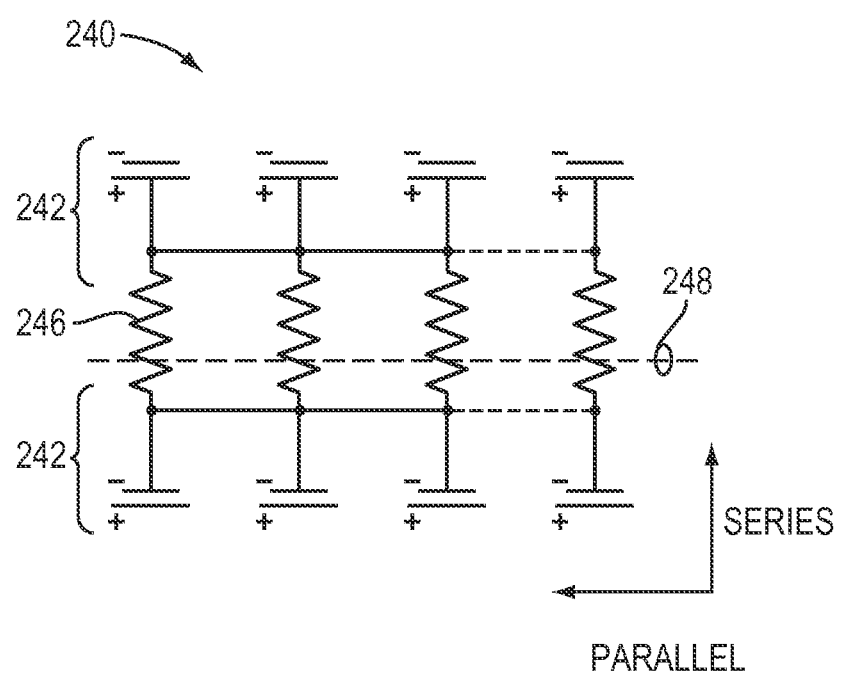
FIG. 13 is a schematic representation of two blocks of battery cells, each block including four battery cells, such as can be employed in the battery block system of the invention.

An electrical diagram showing the series and parallel connections of one embodiment of the battery block system, and battery system, of the invention, is shown in FIG. 13. In this embodiment, battery cells 240 of two battery blocks 242 are shown schematically connected in series by battery cell connectors 222, and the batteries of each battery block 242 are connected in parallel by interconnect board 248.

Figure 14:
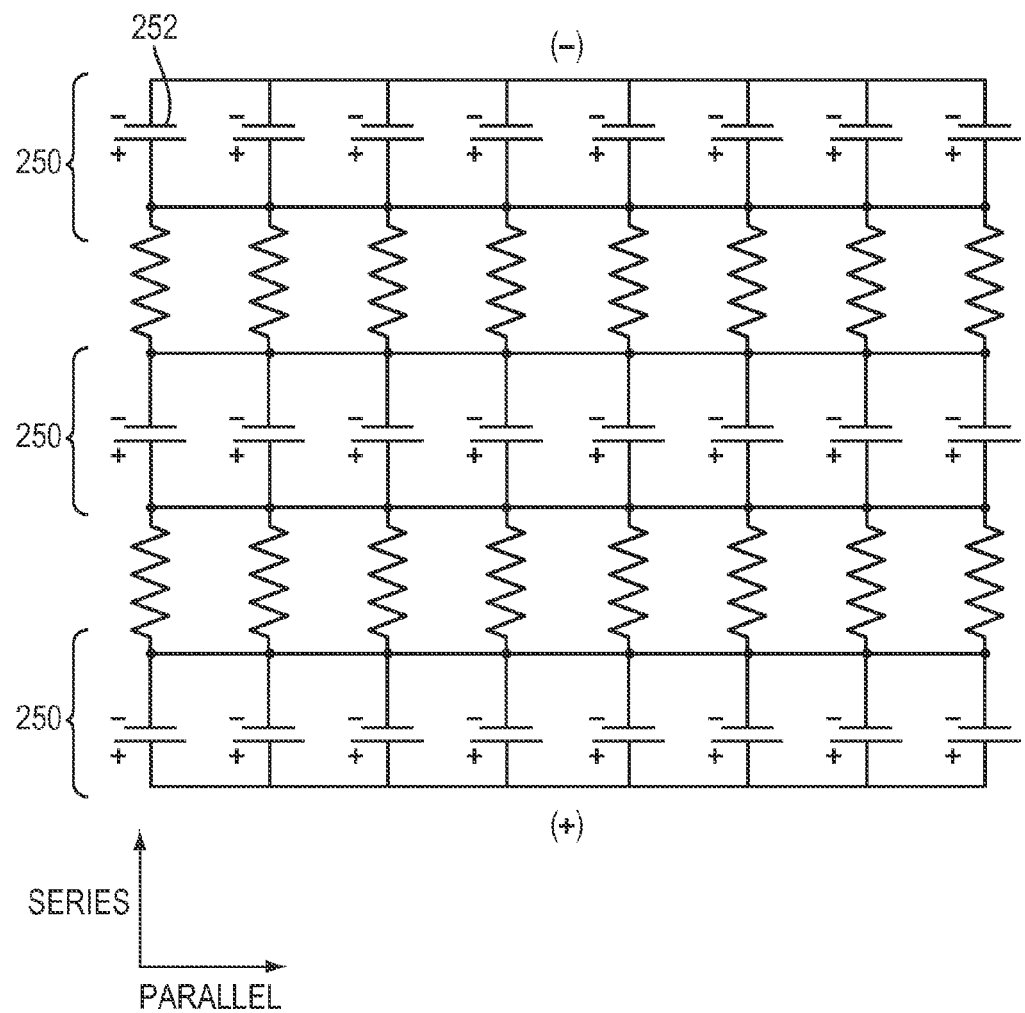
FIG. 14 is a schematic representation of a battery system of the invention, wherein each battery block includes eight battery cells.
Figure 15A:
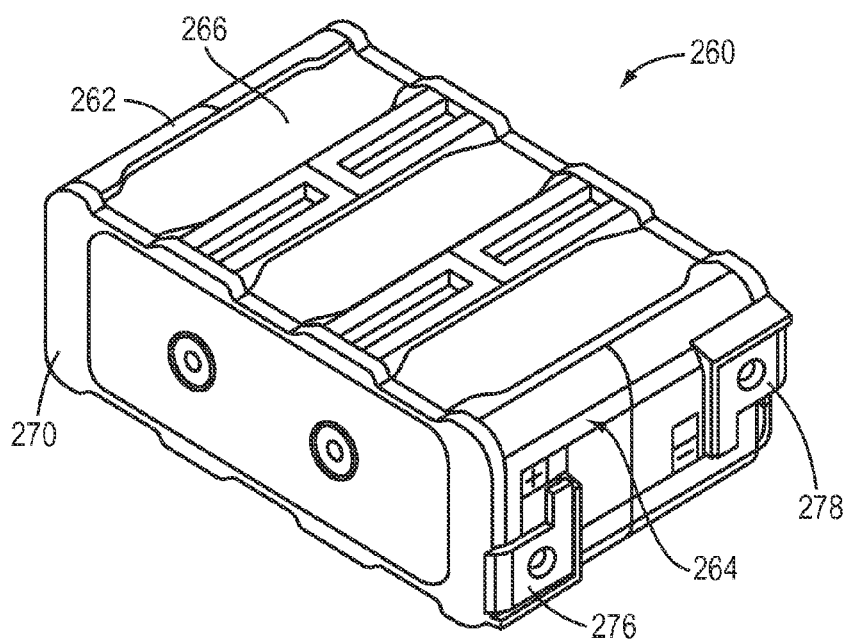
FIG. 15A is a perspective view of another embodiment of the invention, wherein a single battery block of six battery cells are connected in parallel by busbars on either end of the battery cells.
Figure 15B:
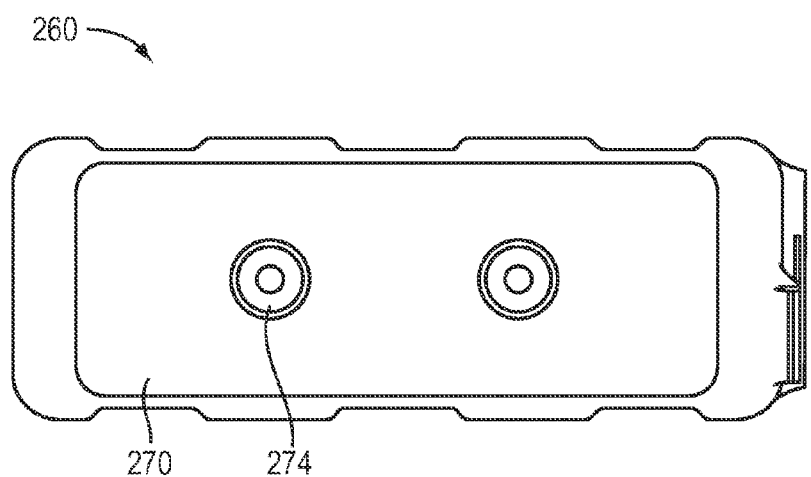
FIG. 15B is an end view of the embodiment of the invention shown in FIG. 15A.
Figure 15C:
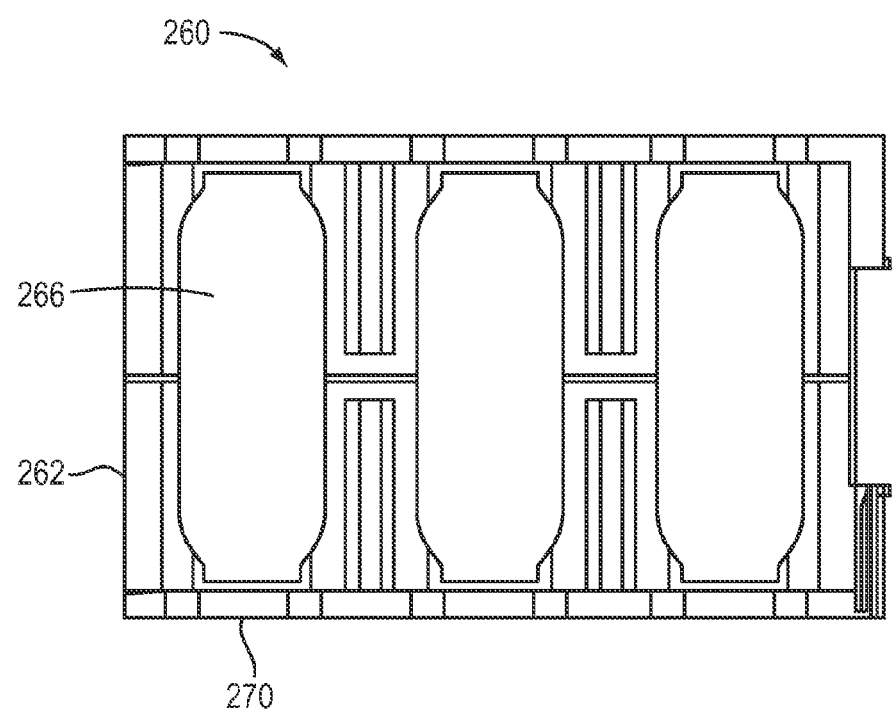
FIG. 15C is a side view of the embodiment of the invention shown in FIG. 15A.
Figure 15D:
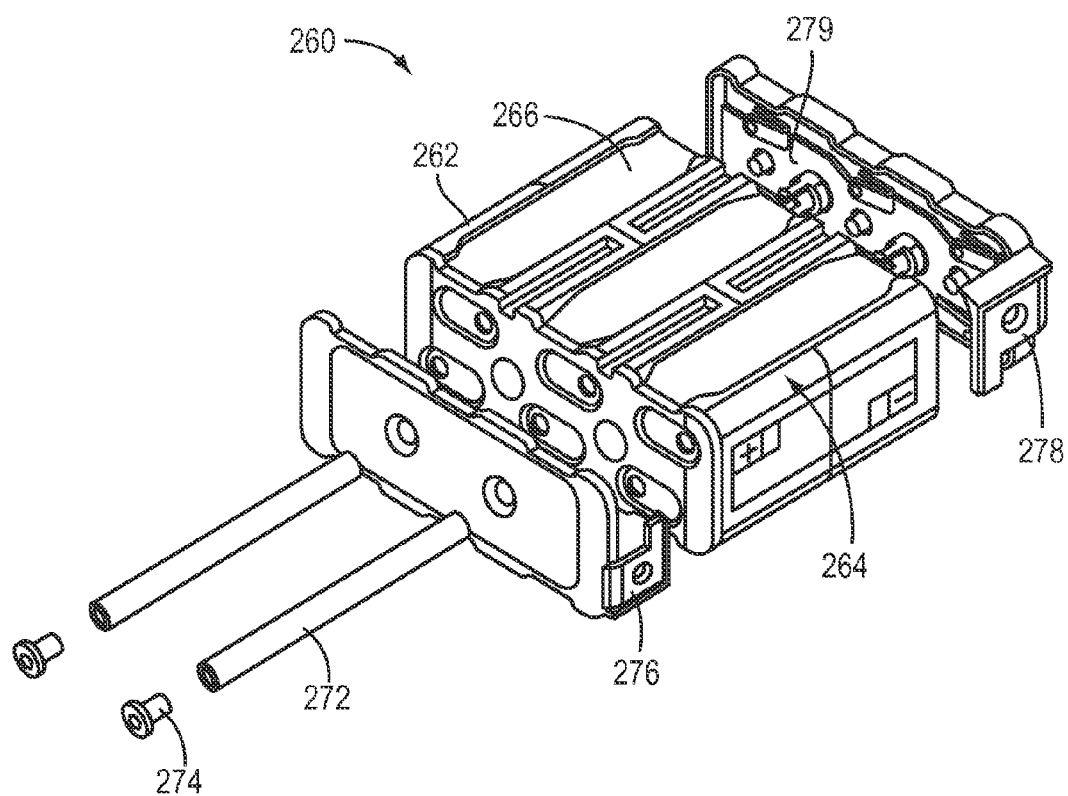
FIG. 15D is an exploded view of the embodiment shown in FIG. 15A.
Figure 16A:
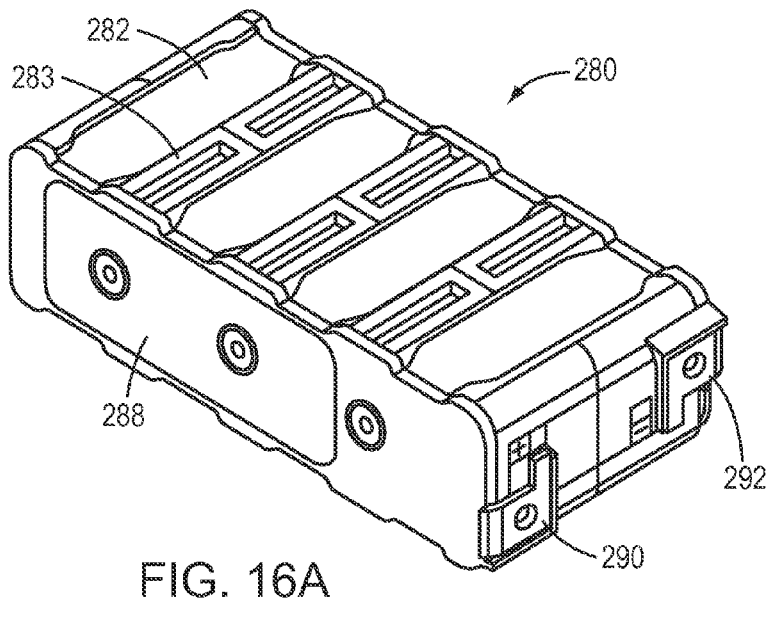
FIG. 16A is a perspective view of another embodiment of the invention, wherein a single battery block of eight battery cells are connected in parallel by busbars on either end of the battery cells.
Figure 16B:
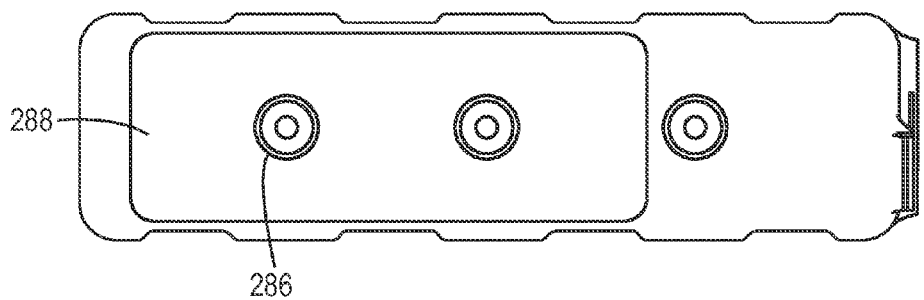
FIG. 16B is an end view of the embodiment of the invention shown in FIG. 16A.
Figure 16C:
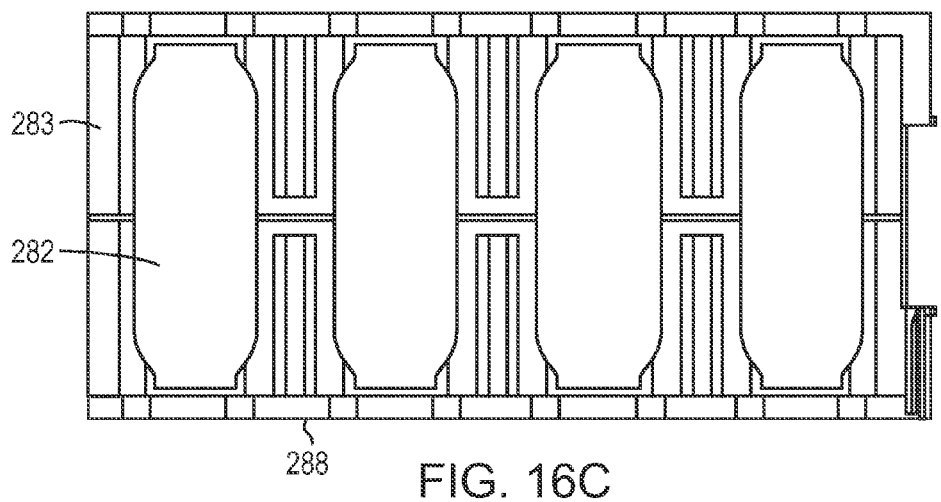
FIG. 16C is a side view of the embodiment of the invention shown in FIG. 16A.
Figure 16D:
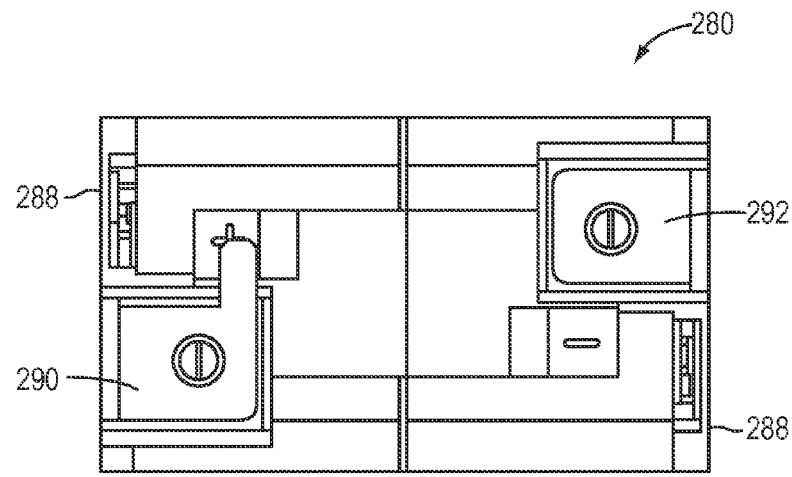
FIG. 16D is a view of the embodiment of the invention shown in FIG. 16B, but turned 90°.
Figure 16E:
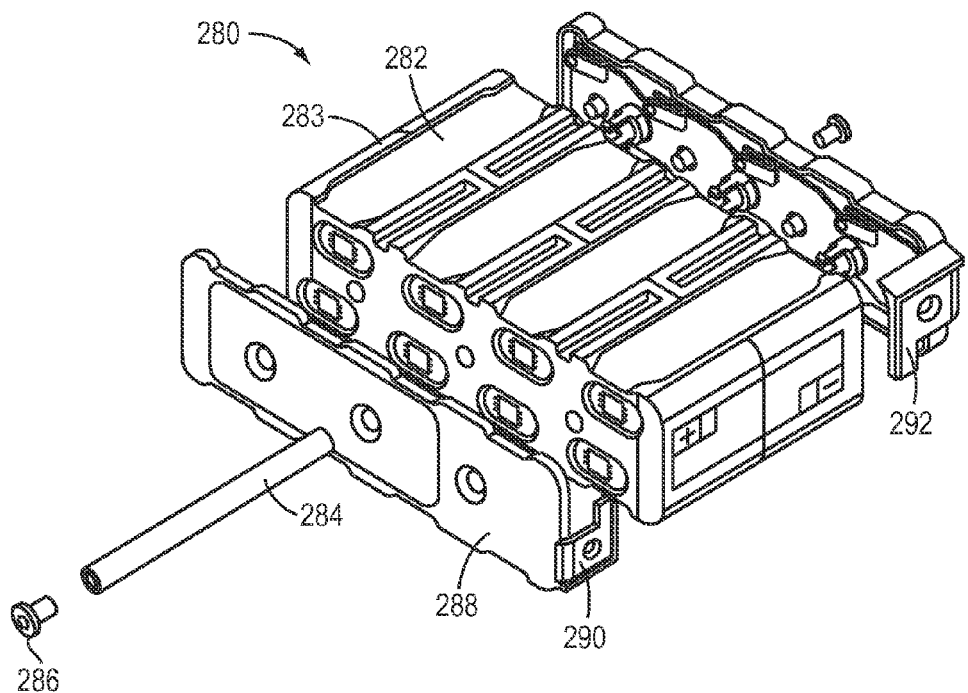
FIG. 16E is an exploded view of the embodiment shown in FIG. 16A.

As can be seen in the electrical diagram of FIG. 14, three battery blocks 250, each including eight battery cells 252, are schematically shown connected in series. The battery cells 252 of each battery block 250 are connected in parallel.

In another embodiment, shown in FIGS. 15A-15D, the battery block system 260 includes a tray 262 supporting a battery block 264 of six battery cells 266. In this embodiment, battery cells are connected in parallel by busbars 268 at either end of tray 262, which are held together by faceplate components 270 through which extend stringers 272 that secure end plates together by threaded screws 274 that extend into stringers 272. Positive terminal 276 and negative terminal 278 of battery block 260 electrically link busbars 279 to other electromechanical components (not shown).

In still another embodiment, shown in FIGS. 16A-16E, battery block 280 includes eight battery cells 282 supported by trays 283, and is fastened together by stringers 284 and screws 286 that extend through faceplates 288 at either end of battery block 280. Terminals 290, 292 connect battery block to other electromechanical components (not shown). The embodiments of the invention shown in FIGS. 15A-15D and 16A-16E do not include an interconnect board.

While this invention has been particularly shown and described with references to example embodiments thereof, it will be understood by those skilled in the art that various changes in form and details may be made therein without departing from the scope of the invention encompassed by the appended claims.

The invention claimed is:

1. A battery cell connector, comprising:
   a) a pair of cantilevered arms in spaced relation to each other, each arm having a base portion and a cantilevered portion, the cantilevered arms each defining a distal end of the cantilevered arm that is opposite the base of the cantilevered arm, each base portion defining an edge portion, each cantilevered portion extending from its base portion, the cantilevered portions being splayed away from each other with distance from their respective base portions; and
   b) a bridge linking the cantilevered arms at the base of each cantilevered arm, and supporting the arms in spaced relation to each other at the edge portion of each base portion, the base portions and the bridge together defining a U-shape in a plane that is transverse to a major longitudinal axis of at least one cantilevered arm; and
   c) a leaf spring between the cantilevered arms, the leaf spring being fixed to the distal ends of the cantilevered arms at opposite ends of the leaf spring, wherein the leaf spring and the cantilevered arms together have a spring constant that differs from a spring constant of the cantilevered arms in the absence of the leaf spring.

2. The battery cell connector of claim 1, wherein the battery connector is of a single, continuous electrically-conductive material.

3. The battery cell connector of claim 1, wherein the pair of cantilevered arms and bridge have an essentially uniform cross-sectional area.

4. The battery cell connector of claim 1, wherein the pair of cantilevered arms and bridge includes a fusible link.

5. The battery cell connector of claim 4, wherein the fusible link has a cross-sectional area less than a cross-sectional area of at least one of the pair of cantilevered arms and bridge.

6. The battery cell connector of claim 1, wherein at least one of the cantilevered arms of the pair of cantilevered arms includes a protrusion for contacting a terminal of a battery cell.

7. The battery cell connector of claim 1, wherein the pair of cantilevered arms has a spring constant of at least 4 kgf/mm.

8. The battery cell connector of claim 1, wherein the pair of cantilevered arms and bridge include steel, copper or a copper alloy, and a plating material that includes at least one member of the group consisting of silver, gold, tin, platinum and palladium.

9. The battery cell connector of claim 8, wherein the copper alloy is a beryllium copper alloy.

10. The battery cell connector of claim 1, wherein each cantilevered arm has a major longitudinal axis.

11. The battery cell connector of claim 1, further including a contact at an end of each of the cantilevered arms distal to the respective base portion, wherein the contact is raised from the cantilevered arm and is fixed to the cantilevered arm.

12. The battery cell connect of claim 1, wherein the leaf spring includes steel.

13. The battery cell connector of claim 1, wherein at least one cantilevered arm (31) is folded about its base.

14. An interconnect board for connecting a plurality of battery cells, comprising:
   a) a circuit board including at least one electrically-conductive channel; and
   b) a plurality of battery cell connectors at the circuit board, at least a portion of which are in electrical communication with each other through the electrically-conductive channel, each battery cell connector including a pair of terminals on opposite sides of the circuit board that are in electrical communication with each other, wherein at least a portion of the battery cell connectors include
      i) a pair of cantilevered arms in spaced relation to each other, each arm having a base portion and a cantilevered portion, the cantilevered arms each defining a distal end of the cantilevered arm that is opposite the base of the cantilevered arm, each base portion defining an edge portion and each cantilevered portion extending from its base portion, the cantilevered portions being splayed away from each other with distance from their respective base portions, ii) a bridge linking the arms at the base of each arm, and supporting the arms in spaced relation to each other at the edge portion of each base portion, the base portions and the bridge together defining a U-shape in a plane that is transverse to a major longitudinal axis of at least one arm, and iii) a leaf spring between the cantilevered arms, the leaf spring being fixed to the distal ends of the cantilevered arms at opposite ends of the leaf spring, whereby the leaf spring and the cantilevered arms together have a spring constant that differs from a spring constant of the cantilevered arms in the absence of the leaf spring.

15. The interconnect board of claim 14, wherein the electrically-conductive channel further includes at least one fusible link between at least a subset of the plurality of battery cell connectors.

16. The interconnect board of claim 15, wherein the at least one fusible link electrically isolates at least one battery cell from other battery cells to which it is electrically connected in response to conducting a current greater than a threshold current.

17. The interconnect board of claim 14, further including an electrical circuit at, or in electrical communication with the circuit board, that balances battery cells connected in parallel with each other through the battery cell connectors.

18. The interconnect board of claim 14, further including an electrical circuit at, or in electrical communication with the circuit board, that indicates voltage of at least a subset of the battery cells.

19. The interconnect board of claim 18, wherein the circuit board further includes at least one terminal that is connected to the voltage circuit.

20. The interconnect board of claim 14, wherein the interconnect board has a major longitudinal axis and defines end portions along the major longitudinal axis, and wherein the circuit board includes at least two terminals located on at least one of the end portions of the interconnect board.

21. The interconnect board of claim 20, further including a temperature circuit at, or in electrical communication with the circuit board, wherein the temperature circuit indicates the temperature of at least one of the battery cells.

22. The interconnect board of claim 20, wherein the circuit board further includes a terminal connection that is connected to the temperature circuit.

23. The interconnect board of claim 14, further comprising a circuit board housing that is in mating relation to the circuit board and the battery cell connectors.

* * * * *